June 19, 1956 T. H. BONN 2,751,510

FULL WAVE MAGNETIC AMPLIFIER

Filed April 5, 1955

INVENTOR.
THEODORE H. BONN

BY Charles C. English
AGENT

United States Patent Office
2,751,510
Patented June 19, 1956

2,751,510

FULL WAVE MAGNETIC AMPLIFIER

Theodore H. Bonn, Philadelphia, Pa., assignor to Remington Rand Inc., Philadelphia, Pa., a corporation of Delaware Application April 5, 1955, Serial No. 499,376
17 Claims. (Cl. 307—88)

The present invention relates to carrier type amplifiers and is more particularly concerned with the provision of magnetic amplifiers of the carrier type capable of producing full wave or substantially D. C. outputs. In this respect a carrier type amplifier is defined as one energized by an alternating power source and controlled by input signals which are of relatively long duration in comparison with one cycle of the power frequency.

Carrier type amplifiers may assume a number of different forms known in the art. In general, such carrier type amplifiers are energized by an alternating carrier potential which may be sinusoidal, square wave or of other appropriate configuration; and the output of such a carrier amplifier normally comprises a series of time-spaced pulses coinciding with half waves of the said carrier excitation. This known half wave output operation often imposes severe limitations upon the form of output circuit which may be coupled to the amplifier, and further requires extensive filtering to effect an eventual output signal capable of utilization in certain applications.

The present invention serves to obviate these difficulties and in this respect provides a carrier type amplifier producing outputs analogous to full wave operation; or, assuming a square-wave excitation of the said amplifier, an output which is substantially direct current.

It is accordingly an object of the present invention to provide a novel carrier type amplifier.

A further object of the present invention resides in the provision of a carrier type magnetic amplifier capable of full wave operation.

A further object of the present invention resides in the provision of a magnetic amplifier employing plural stages, the outputs of which may be selectively interlaced to reduce ripple.

Still another object of the present invention resides in the provision of a carrier type magnetic amplifier which is more rugged in configuration and which has better operating characteristics than other amplifiers known heretofore.

In providing for the foregoing objects, the carrier amplifier of the present invention comprises an amplifier system having plural stages. A first such stage may take the form of a single core carrier amplifier of either the complementing or non-complementing type; and in this respect a complementing amplifier is defined as one which produces output pulses in the absence of an input thereto, while a non-complementing amplifier is defined as one which produces output pulses only in response to an input thereto. When such a carrier type stage is employed, a train of output pulses will be produced therefrom in response to an input signal of duration relatively long in comparison with the repetition rate of the said output pulses. This train of output pulses may be then time delayed by appropriate delay means, and the original train and the time delayed train of pulses may then be interlaced, for instance by buffer means coupled to the output of the said amplifier stage and to the output of the said delay means, thereby to produce an ultimate output of substantially full wave configuration.

In accordance with a preferred embodiment of the present invention, the delay means may comprise a further magnetic amplifier, preferably a pulse type non-complementing magnetic amplifier; and in this respect a pulse type amplifier is defined as one producing output pulses in response to input signals applied thereto, the duration of the input signal being of the same magnitude as the duration of the said output pulses. When pulse type amplifiers are employed in the system, one pulse type amplifier may be coupled to the output of a carrier type amplifier stage thereby to produce a first train of pulses, and a further pulse type amplifier may be selectively energized by the said first train of pulses, thereby to provide a further train of pulses time delayed with respect to said first train of pulses. Once more, these two trains of pulses may be interlaced to provide full wave outputs.

It should be noted, however, that even though pulse type amplifier stages are employed in preferred embodiments of the present invention, the over-all amplifier arrangement nevertheless acts as a carrier type amplifier, inasmuch as the original signal input to the system is of duration relatively long in comparison with the repetition rate of pulses appearing in the ultimate output of the system.

The foregoing objects, advantages, construction and operation of the present invention will become more readily apparent from the following description and accompanying drawings, in which.

Figures 1, 2, 3:
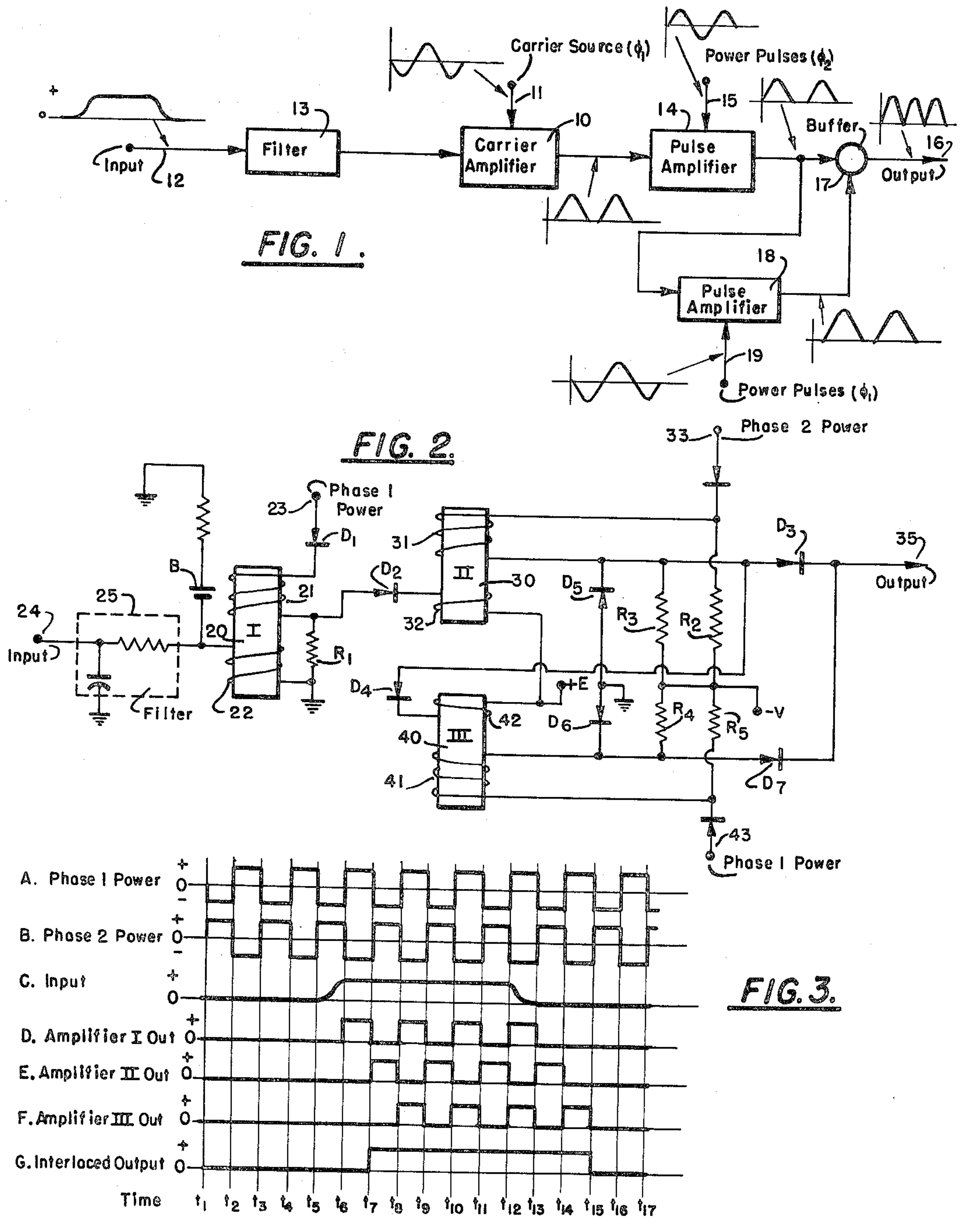
Figure 1 is a block diagram of a carrier amplifier system constructed in accordance with the present invention.
Figure 2 is a schematic diagram of one form of magnetic amplifier system in accordance with the logic of Figure 1.
Figure 3 (A through G) are waveforms illustrating the operation of the amplifier system shown in Figure 2.

Referring now to the arrangement of Figure 1, it will be seen that a system in accordance with the present invention may comprise a carrier amplifier 10, energized by a source of alternating carrier potential 11. In the particular example shown in Figure 1, this carrier source 11 comprises means generating a sinusoidal carrier wave, but it is to be understood that the said carrier wave may in fact assume other alternating configurations such as a square wave. Carrier amplifier stage 10 is selectively controlled from an input 12 coupling signals to the said amplifier 10 via a filter 13, this filter being desirably supplied to keep carrier frequency potentials out of the input circuit. The output of carrier amplifier 10 is further coupled to a delay element which may comprise a pulse type amplifier 14; and when such a pulse type amplifier is in fact employed, it may in turn be energized by a source of regularly occurring power pulses 15 of a phase different from that of the carrier source 11. In this respect it should be noted that the phase difference is such that a positive-going half cycle of carrier potential applied to the amplifier 10 coincides with a negative-going half cycle of power potential applied to the amplifier 14, and vice versa.

The output of pulse type amplifier 14 selectively comprises a plurality of half wave pulses time delayed in respect to the output of carrier amplifier 10, and this output of amplifier 14 may be coupled to an output point 16 via a buffer 17, and may also be coupled to the input of a further pulse type amplifier 18 (which may again comprise other forms of suitable delay elements). Amplifier 18 is also energized by a source 19 of alternating power potential, this time of the same phase as that of the carrier source 11; and the energization sources 11 and 19 may in fact comprise a single source coupled to the amplifiers 10 and 18. Pulse amplifier 18 again produces a further series of regularly occurring output pulses and this further series of pulses may be coupled once more to the output point 16 via the buffer 17. Inasmuch, however, as the pulse type amplifiers 14 and 18 are energized by power pulses of differing phases, and inasmuch as the inputs to these amplifiers are similarly of different phases, the two outputs coupled from amplifiers 14 and 18 to the buffer 17 comprise, respectively, pulses occurring during alternate time intervals whereby the output of buffer 17, appearing at point 16, comprises a single pulse train representative of an interlacing of the outputs of amplifiers 14 and 18.

In the particular example shown in Figure 1, sinusoidal energization has been assumed throughout, whereby the output signal appearing at point 16 comprises a pulsating full wave potential, and therefore for certain systems it may be desirable to include further filter means coupled to the output of the said buffer 17 to reduce the amplitudes of the several ripple frequencies even further. It should be noted, however, that the power pulse sources 15 and 19, coupled respectively to the pulse type amplifiers 14 and 18, may assume a square wave configuration; and when this type of energization is in fact employed, the interlacing of the two pulse train outputs of the said amplifiers 14 and 18 will result in a substantially D. C. signal output at the point 16.

One possible circuit arrangement constructed in accordance with the logic of Figure 1, has been shown in Figure 2, and this particular arrangement comprises a single stage carrier type magnetic amplifier I, followed by a second amplifier stage comprising two pulse type magnetic amplifiers II and III. The carrier type amplifier may comprise a core 20 of magnetic material, preferably but not necessarily exhibiting a substantially rectangular hysteresis loop. Such cores may be made of a variety of materials, among which are various types of ferrites and various kinds of magnetic tapes, including Orthonik and 4–79 Moly-Permalloy and these materials may be given different heat treatments to effect different desired properties. As will appear subsequently, the cores 30 and 40 utilized in magnetic amplifiers II and III may again comprise materials of similar characteristics, but it must be emphasized that the present invention is not limited to any specific geometries of the cores utilized, nor to any specific materials therefor, and the examples to be given are illustrative only.

The carrier type magnetic amplifier core 20 carries a power or output winding 21 thereon, coupled at one of its ends via a rectifier D1 to a source 23 of alternating power pulses of assumed phase 1 (see Figure 3A). The core 20 further carries a signal or input winding 22 thereon, coupled at one of its ends to an input terminal 24, via a filter 25. Also coupled to the said signal or input winding 22 is a bias source B which serves to maintain the output of the said carrier amplifier I at a predetermined operating point, preferably at substantially zero output, in the absence of a signal input at terminal 24.

In operation, and assuming that the core 20 is initially at its minus remanence operating point, a first positive-going carrier pulse applied from the source 23, will effect a current flow through the rectifier D1 and power winding 21, driving the core 20 to its plus remanence operating point. Inasmuch as this state of operation produces a relatively large rate of flux change in the core 20, the winding 21 exhibits a relatively high impedance, whereby little if any output will appear across the resistance $R_1$. When the power pulse applied from the source 23 is negative-going in polarity, the rectifier D1 will be substantially cut off whereby a current will flow, due to the bias source B, through the signal winding 22, reverting the core 20 to its minus remanence operating point; and the next positive-going power pulse will therefore again find the coil 21 to exhibit a relatively high impedance. Thus, due to the arrangement shown, the core 20 is caused to regularly traverse its hysteresis loop in the absence of a signal input at terminal 24, whereby substantially no output will appear from the amplifier I. The application of a signal input at terminal 24, however, effectively opposes the reverting effect of the bias source B, whereby the core 20 will be driven into saturation by pulses from the source 23, and positive-going output pulses will thereafter appear from the amplifier stage in coincidence with positive-going power pulses applied from the said source 23.

The foregoing description has assumed non-complementing operation, of course, inasmuch as no output is obtained from the amplifier until an input is applied from the source 24. By removing the bias source B and reversing the winding direction of signal winding 22, however, it will be noted that the device will act as a complementer and will produce regularly occurring pulse outputs in the absence of a signal input from the source 24.

The output of carrier type magnetic amplifier I is coupled to the input of a delay element, which may comprise a pulse type magnetic amplifier II. In the particular example shown in Figure 2, this pulse type amplifier is assumed to be a non-complementing amplifier and such an amplifier may once more comprise a magnetic core 30, preferably but not necessarily exhibiting a substantially rectangular hysteresis loop. The core 30 again carries two windings thereon, namely, a power or output winding 31 and a signal or input winding 32, and one end of the power winding 31 is coupled to a source 33 of regularly occurring power pulses of the configuration shown in Figure 3B. One end of the signal or input winding 32 is coupled via a rectifier D2 to the output of the carrier amplifier stage I.

Discussing briefly the operation of the pulse type magnetic amplifier II in the absence of inputs thereto from amplifier I, let us assume that the core 30 is initially at its minus remanence operating point. A first positive-going power pulse from the source 33 will drive the core 30 from its minus remanence operating point to its plus remanence operating condition and, as was mentioned previously, the winding 31 will exhibit a relatively high impedance for this state of operation, whereby substantially no output will appear from the amplifier II via either rectifier D3 or rectifier D4. During a next subsequent time interval, when the applied power pulse from source 33 is negative-going, a reverse current will flow from ground through the rectifier D5 and thence through the power winding 31 and the resistor R2 to a source of negative potential —V. The magnitude of this reverse current flow is sufficient to flip the core 30 from its plus remanence operating point to its minus remanence operating point during this next subsequent time interval, whereby the next following positive-going power pulse from the source 33 will once more drive the core 30 along its high impedance operating portion without effecting an output therefrom.

If, however, an input pulse should be applied to the winding 32 via the rectifier D2, then during the application of a negative-going power pulse from source 33 a current will flow through the said signal winding 32 in a direction producing a magnetomotive force in opposition to that effected by the reverse current flow through winding 31 during this same time interval. The application of an input pulse to the winding 32 will therefore cause the core 30 to remain at its plus remanence operating point whereby the next subsequent positive-going power pulse will drive the core 30 into positive saturation, effecting an output from the amplifier II via the rectifiers D3 and D4. In the absence of a still further input pulse via the rectifier D2, the reverse current flow through winding 31 will again flip the core to its minus remanence operating point during the next following negative-going power pulse portion, whereby the amplifier will once more revert to a non-output producing state.

Thus, as will be seen from the foregoing description, the magnetic amplifier arrangement comprising amplifier II, produces no output pulses in the absence of an input thereto and is responsive to an input pulse during a negative-going power pulse portion for effecting an output pulse during the next subsequent positive-going power pulse. The device thus acts as a non-complementing magnetic amplifier.

The amplifier arrangement further includes a resistor R3 coupled from one end of the power or output winding 31 to the source of negative potential —V, and the resistor R3 cooperates with the previously discussed rectifier D5 to provide a clamp circuit maintaining the output point of amplifier II at substantially ground potential in the absence of a desired output. By this arrangement, possible sneak outputs effected during time intervals when the core 30 is being driven from its minus remanence to its plus remanence operating points are effectively suppressed.

The output of pulse type amplifier II is fed via the rectifier D3 to an output point 35 and is also coupled via a rectifier D4 to the input of a further pulse type magnetic amplifier III. This further amplifier operates in accordance with the discussion previously given in respect to amplifier II and comprises, in general, a magnetic core 40 having a power or output winding 41, a signal or input winding 42, a phase 1 power source 43, a rectifier D6 and resistors R4 and R5. The output of pulse type magnetic amplifier III selectively appears via rectifier D7, whereby it is once more coupled to the output point 35.

The operation of the over-all system will become more readily apparent from a consideration of the waveforms shown in Figure 3. As was mentioned previously, each of amplifiers I and III are energized by phase 1 power pulses of the type shown in Figure 3A, while amplifier II is energized by phase 2 power pulses of the type shown in Figure 3B. In the waveforms of Figure 3, these power pulses have been assumed to be square wave in configuration, in contradistinction to the sinusoidal representation employed in the arrangement of Figure 1. In the absence of an input pulse at the terminal 24 during the time interval *t1* to *t5*, there will be no outputs from any of the amplifiers I, II or III, nor will there be an output at the terminal 35. If now an input signal should be applied at the terminal 24 during the time interval *t5* to *t13* (Figure 3C), the carrier stage I will commence producing outputs during the time intervals *t6* to *t7*, *t8* to *t9*, *t10* to *t11*, and *t12* to *t13* (Figure 3D). These pulses will be coupled via the rectifier D2 to the input of pulse type amplifier II whereby the said amplifier II will produce a further train of output pulses appearing respectively during the time intervals *t7* to *t8*, *t9* to *t10*, *t11* to *t12*, and *t13* to *t14*. This further train of pulses is coupled via the rectifier D3 to the output point 35, and is also coupled via the rectifier D4 to the input of pulse type magnetic amplifier III whereby amplifier III produces still another train of output pulses appearing respectively during the time intervals *t8* to *t9*, *t10* to *t11*, *t12* to *t13*, and *t14* to *t15* (Figure 3F). As was mentioned previously, the output trains from amplifiers II and III are buffed via rectifiers D3 and D7 to the common output point 35 and due to the time considerations discussed previously, these two output trains will be interlaced to produce a substantially D. C. output signal during the time interval *t7* to *t15* (Figure 3G).

It should be noted that the input signal applied from terminal 24 during the time interval *t5* to *t14* is assumed to be long in comparison with one cycle of the power frequency, and moreover this input signal is not necessarily synchronized in any way with the power frequency. Thus, notwithstanding the utilization of pulse amplifier stages, the over-all system operates in accordance with the definition of a carrier type amplifier and may be assumed to represent such a carrier amplifier. In addition, it should be noted that the subcomponent of the system comprising the carrier amplifier stage 10 and the pulse amplifier stage 14 (or the amplifiers I and II), similarly operate in accordance with the definition of a carrier amplifier and may be considered to represent a single carrier amplifier, in which case the further pulse type amplifier 18 (or III) may be considered to represent appropriate delay means serving to produce a further train of signals which may be interlaced with the original pulse train, thereby to effect the desired full wave output. In addition, and as has been mentioned previously, the carrier type amplifier may be of either the complementing or non-complementing type, in which case the over-all system will act as either a complementing or non-complementing carrier type amplifier, when non-complementing pulse type amplifiers or other delay means are employed in the stages 14 and 18.

While particular forms of amplifiers have been shown, it must further be understood that other forms may be employed and in particular, the series type amplifiers shown in Figure 2 for the amplifier stages II and III may be replaced by appropriate parallel type amplifiers. In this respect, for instance, reference is made to the copending application of Theodore H. Bonn and Robert D. Torrey, Serial No. 402,858, filed January 8, 1954, for "Signal Translating Device"; and to the copending application of John Presper Eckert, Jr., and Theodore H. Bonn, Serial No. 382,180, filed September 24, 1953, for "Signal Translating Device." These applications have been assigned to the assignee of the instant invention, and disclose additional forms of magnetic amplifiers, both of the series and parallel types, which may be readily employed in the practice of the instant invention. In addition, by appropriate changes in the various polarities and potentials employed, as well as in the winding directions of the several amplifiers, either positive or negative output signals may be obtained from the system. It must be understood therefore that while a preferred embodiment of the present invention has been shown, this embodiment is meant to be illustrative only and is not limitative of my invention. Many modifications will be suggested to those skilled in the art, and all such variations as are in accord with the principles discussed previously are meant to fall within the scope of the appended claims.

Having thus described my invention, I claim:

1. In an amplifier system, first amplifier means selectively producing a first train of output pulses, second amplifier means coupled to said first amplifier means for producing a second train of pulses in response to said first train of pulses, third amplifier means coupled to said second amplifier means for producing a third train of pulses in response to said second train of pulses, and means coupled to the outputs of said second and third amplifier means for interlacing said second and third trains of pulses.

2. The system of claim 1 wherein said first amplifier means comprises a carrier type magnetic amplifier.

3. The system of claim 2 wherein each of said second and third amplifier means comprises a pulse type magnetic amplifier.

4. The system of claim 3 wherein each of said magnetic amplifiers includes a core of magnetic material exhibiting a substantially rectangular hysteresis loop.

5. In an amplifier system, a carrier type magnetic amplifier, a first pulse type magnetic amplifier coupled to the output of said carrier amplifier, a second pulse type magnetic amplifier coupled to the output of said first pulse type amplifier, and buffer means coupling the outputs of said first and second pulse type amplifiers to a common output point.

6. The amplifier system of claim 5 wherein said carrier type amplifier and one of said pulse type amplifiers are energized by power pulses of a first phase, and means coupled to the other of said pulse type amplifiers for energizing said other amplifier with power pulses of a second phase different from said first phase.

7. In an amplifier system, a carrier type magnetic amplifier selectively producing a train of spaced output pulses in response to a signal input thereto, first and second pulse generating means responsive to the output pulse train of said carrier type amplifier for producing respectively two further trains of spaced pulses, and means for interlacing said two further trains of pulses.

8. The system of claim 7 wherein said means for interlacing said further trains of pulses comprises buffer means coupling the outputs of said first and second pulse generating means to a common output point.

9. The system of claim 7 wherein each of said first and second pulse generating means comprises a non-complementing pulse type amplifier.

10. In an amplifier system, a single core carrier type magnetic amplifier selectively producing pulse outputs, a first non-complementing amplifier responsive to said pulse outputs for producing a first train of pulses occurring respectively during first predetermined time intervals, a second non-complementing amplifier, means coupling the output of said first non-complementing amplifier to the input of said second non-complementing amplifier whereby said second non-complementing amplifier produces a second train of pulses occurring respectively during second predetermined time intervals different from said first time intervals, and means coupling said first and second trains of pulses to a common output point.

11. The system of claim 10 wherein said first and second non-complementing amplifiers comprise pulse type magnetic amplifiers.

12. The system of claim 11 wherein said carrier type amplifier and each of said pulse type amplifiers includes a core of magnetic material exhibiting a substantially rectangular hysteresis loop.

13. In an amplifier system, a carrier type magnetic amplifier selectively producing a first train of output pulses, delay means coupled to the output of said amplifier for producing a second train of pulses time delayed from said first train of pulses, and means coupling the outputs of said amplifier and of said delay means to a common output point.

14. The system of claim 13 in which said delay means comprises a pulse type non-complementing magnetic amplifier.

15. The system of claim 13 in which said carrier type magnetic amplifier comprises a non-complementing carrier type amplifier and a non-complementing pulse type amplifier connected in cascade.

16. In an amplifier system, an amplifier stage producing a train of spaced output pulses in response to a signal input, said input signal being relatively long in comparison with the repetition rate of said output pulses, delay means coupled to the output of said stage for producing a time delayed pulse train, and means coupled to the output of said amplifier stage and to the output of said delay means for interlacing said time delayed pulses in the spaces between said spaced output pulses.

17. The system of claim 16 wherein said delay means includes a pulse type magnetic amplifier.

No references cited.